(12) United States Patent
Karin

(10) Patent No.: US 6,824,056 B1
(45) Date of Patent: Nov. 30, 2004

(54) AUTO-FOCUS METHOD FOR A SCANNING MICROSCOPE

(75) Inventor: Jacob Karin, Ramat Gan (IL)

(73) Assignee: Accretech (Israel) Ltd., Herzeliya (IL)

( * ) Notice: Subject to any disclaimer, the term of this patent is extended or adjusted under 35 U.S.C. 154(b) by 51 days.

(21) Appl. No.: 10/678,060

(22) Filed: Oct. 6, 2003

(51) Int. Cl.⁷ .................................................. G06K 7/14
(52) U.S. Cl. ................................... 235/454; 235/462.23
(58) Field of Search ........................... 235/454, 462.01, 235/462.22, 462.23, 462.42

(56) References Cited

U.S. PATENT DOCUMENTS

| | | | | |
|---|---|---|---|---|
| 4,000,417 A | | 12/1976 | Adkisson et al. ........... 250/202 |
| 5,003,600 A | * | 3/1991 | Deason et al. ................ 380/54 |
| 5,541,394 A | * | 7/1996 | Kouchi et al. .............. 235/375 |
| 5,633,487 A | * | 5/1997 | Schmutz et al. ....... 235/462.22 |
| 5,783,814 A | | 7/1998 | Fairley et al. ........... 250/201.2 |
| 5,978,083 A | * | 11/1999 | Muller ...................... 356/450 |
| 6,325,289 B1 | | 12/2001 | Mazzone ............... 235/462.14 |

* cited by examiner

Primary Examiner—Daniel St.Cyr
(74) Attorney, Agent, or Firm—Mark M. Friedman

(57) ABSTRACT

An auto-focus method for focusing an optical arrangement of a sub-micron optical system. The optical system includes a head, at least part of the optical arrangement being mechanically connected to the head. The optical arrangement is configured for reading from or writing to a surface of a medium. The head performs a scanning motion relative to the surface. The method includes illuminating at least part of a first viewing region of the surface by the optical arrangement while performing a focus range measurement of a second viewing region of the surface. The method also includes providing relative movement between the medium and the head in order for the optical arrangement to illuminate at least part of the second viewing region. The method additionally includes adjusting the focus of the optical arrangement based upon the focus range measurement.

16 Claims, 4 Drawing Sheets

AUTO-FOCUS METHOD FOR A SCANNING MICROSCOPE

FIELD AND BACKGROUND OF THE INVENTION

The present invention relates to an auto-focusing method and apparatus and, in particular, it concerns an auto-focusing method and apparatus for a scanning microscope.

By way of introduction, high-resolution scanners, such as scanning microscopes, are used to detect defects in wafers. The resolution of such scanners is typically better than 500 nanometers. Resolution is generally defined as the size of the smallest distinguishable feature. In order for the process to be effective the process needs to be accurate and fast. Prior art high-resolution scanners employ an auto-focus method as follows. First, the scanning head of the scanner moves to a new viewing region above the surface of the sample to be read. A measurement beam is passed through the optics of the scanner and is reflected off of the new viewing region back through the optics of the scanner. The focus of the scanner is then adjusted based upon analysis of the measurement beam. The scanner then reads from the new viewing region. Therefore, there is a time delay while adjusting the focus of the scanner.

With respect to an unrelated art, namely, low-resolution scanning systems, a method for reducing time delay associated with focusing adjustments for low-resolution scanning systems is taught by U.S. Pat. No. 6,325,289 to Mazzone. Mazzone teaches an apparatus and process for focusing a laser beam for reading optical codes. The apparatus includes an optical reader which enables optical codes to be read on objects carried on a supporting plane which is provided with a conveyor for moving the objects along a feeding direction. The optical reader includes a laser beam scanner, a data processing unit connected to the scanner, a first scanner for generating at least a first scan in a first scan plane, so as to measure the instantaneous distance of at least one point on the surface of each of the objects from the scanner, a second scanner for generating a plurality of second scans in a second scan plane, different from the first, so as to read the optical code on the object; and a data processing unit for adjusting the laser beam focal setting according to the distance measured with the first scan. The above apparatus employs a polygon mirror arrangement to perform the reading and measuring scans without moving the laser. Polygon mirror arrangements are not suitable for high-resolution scanning systems. Polygon mirror arrangements are typically employed for scanners having a maximum resolution of approximately half a millimeter. Therefore, the system taught by Mazzone cannot be applied to high-resolution scanning systems. Additionally, in accordance with one of the embodiments taught by Mazzone, the measurement and reading scans are not performed at the same time, thereby wasting time. In accordance with another embodiment taught by Mazzone, the measurement and reading scans are performed at the same time using separate parallel optical arrangements. Separate parallel optical arrangements may be suitable for low-resolution requirements of reading optical codes, such as bar codes, but high-resolution applications generally require the measurement scans to be performed using the same optics with which the reading scan is performed.

There is therefore a need for a system and method for reducing delays associated with focusing adjustments.

SUMMARY OF THE INVENTION

The present invention is an auto-focus scanning microscope construction and method of operation thereof.

According to the teachings of the present invention there is provided, an auto-focus method for focusing an optical arrangement of a sub-micron optical system, the optical system including a head, at least part of the optical arrangement being included in the head, the optical arrangement being configured for reading from or writing to a surface of a medium, the head performing a scanning motion relative to the surface, the method comprising: (a) illuminating at least part of a first viewing region of the surface by the optical arrangement; performing a focus range measurement of a second viewing region of the surface, the step of configuring and the step of performing being performed substantially at the same time, wherein a centroid of the first viewing region is offset from a centroid of the second viewing region at least in a direction which is parallel to a direction of relative motion of the medium and the head; (b) providing relative movement between the medium and the head in order for the optical arrangement to illuminate at least part of the second viewing region; and (c) adjusting the focus of the optical arrangement based upon the focus range measurement.

According to a further feature of the present invention, the step of performing is performed by sending a measurement ray through at least part of the optical arrangement.

According to a further feature of the present invention: (a) the optical arrangement includes a lens which is included in the head; and (b) the step of performing is performed by sending a measurement ray through the lens.

According to a further feature of the present invention, the measurement ray passes through an optical center of the lens.

According to a further feature of the present invention, the first viewing region and the second viewing region are non-overlapping.

According to the teachings of the present invention there is also provided a sub-micron optical system for reading from or writing to a surface of a medium, comprising: (a) an optical arrangement and a head, at least part of the optical arrangement being included in the head; (b) a drive mechanism configured for providing relative movement between the medium and the head in a drive direction; (c) an auto-focus measurement system; and (d) an auto-focus mechanical system configured to adjust the focus of the optical arrangement based upon at least one focus range measurement taken by the auto-focus measurement system, wherein: (i) the optical arrangement and the auto-focus measurement system are configured, such that, the optical arrangement illuminates at least part of a first viewing region of the surface substantially at the same time that the auto-focus measurement system performs a focus range measurement of a second viewing region of the surface; and (ii) a centroid of the first viewing region is offset from a centroid of the second viewing region at least in the drive direction.

According to a further feature of the present invention, the auto-focus measurement system is configured to direct a measurement ray through at least part of the optical arrangement.

According to a further feature of the present invention: (a) the optical arrangement includes a lens which is included in the head; and (b) the auto-focus measurement system is configured to direct a measurement ray through the lens.

According to a further feature of the present invention, the auto-focus measurement system is configured to direct the measurement ray through an optical center of the lens.

According to a further feature of the present invention, the first viewing region and the second viewing region are non-overlapping.

According to the teachings of the present invention there is also provided an auto-focus method for focusing an optical arrangement of an optical system, the optical system including a head, the optical arrangement including a lens, the lens being included in the head, the optical arrangement being configured for reading from or writing to a surface of a medium, the head performing a scanning motion relative to the surface, the method comprising: (a) illuminating at least part of a first viewing region of the surface by the optical arrangement; (b) performing a focus range measurement of a second viewing region of the surface, the performing including sending a measurement ray through the lens, the step of configuring and the step of performing being performed substantially at the same time, wherein a centroid of the first viewing region is offset from a centroid of the second viewing region at least in a direction which is parallel to a direction of relative motion of the medium and the head; (c) providing relative movement between the medium and the head in order for the optical arrangement to illuminate at least part of the second viewing region; and (d) adjusting the focus of the optical arrangement based upon the focus range measurement.

According to a further feature of the present invention, the measurement ray passes through an optical center of the lens.

According to a further feature of the present invention, the first viewing region and the second viewing region are non-overlapping.

According to the teachings of the present invention there is also provided an optical system for reading from or writing to a surface of a medium, comprising: (a) an optical arrangement and a head, the optical arrangement having a lens which is included in the head; (b) a drive mechanism configured for providing relative movement between the medium and the head in a drive direction; an auto-focus measurement system configured to direct a measurement ray through the lens; and (c) an auto-focus mechanical system configured to adjust the focus of the optical arrangement based upon at least one focus range measurement taken by the auto-focus measurement system, wherein: (i) the optical arrangement and the auto-focus measurement system are configured, such that, the optical arrangement illuminates at least part of a first viewing region of the surface substantially at the same time that the auto-focus measurement system performs a focus range measurement of a second viewing region of the surface; and (ii) a centroid of the first viewing region is offset from a centroid of the second viewing region at least in the drive direction.

According to a further feature of the present invention, the auto-focus measurement system is configured to direct the measurement ray through an optical center of the lens.

According to a further feature of the present invention, the first viewing region and the second viewing region are non-overlapping.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is an auto-focus scanning microscope construction and method of operation thereof.

The principles and operation of an auto-focus microscope according to the present invention may be better understood with reference to the drawings and the accompanying description.

Figure 1:
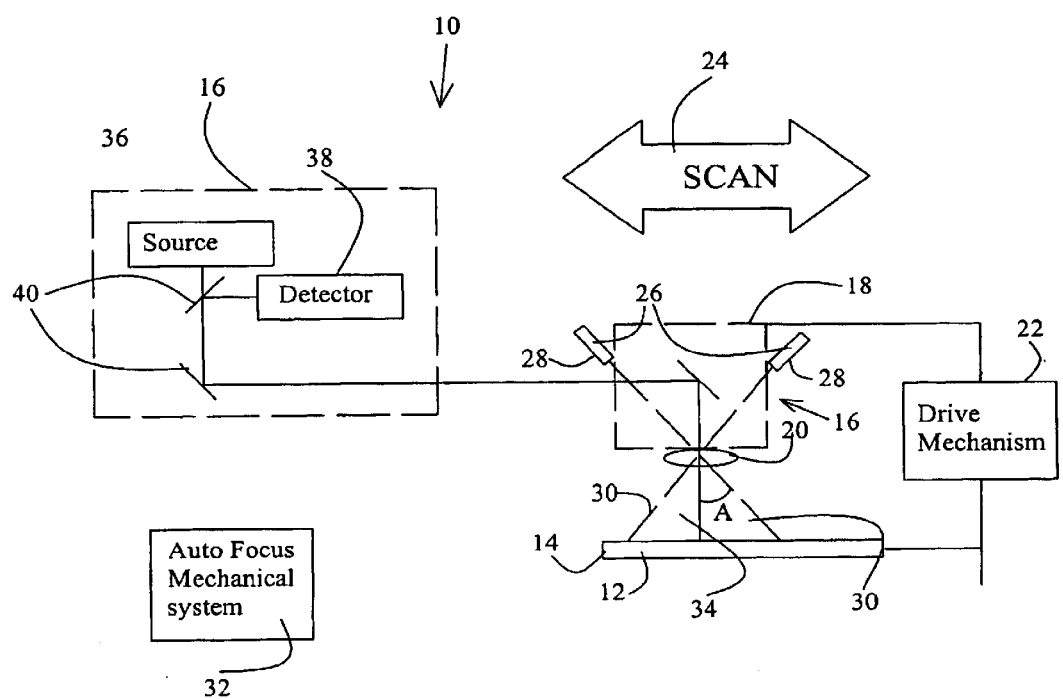
FIG. 1 is a schematic side view of a sub-micron optical system that is constructed and operable in accordance with a preferred embodiment of the invention.

Reference is now made to FIG. 1, which is a schematic side view of a sub-micron optical system 10 that is constructed and operable in accordance with a preferred embodiment of the invention. Medium 12 is typically a semiconductor wafer. Optical system 10 has an optical arrangement 16 and a head 18. Optical arrangement 16 is configured for reading from, or writing to, a surface 14 of a medium 12. Optical arrangement 16 generally includes a light source 36, a light detector 38, lenses and mirrors 40. A part of optical arrangement 16, which includes an objective lens 20, is included in head 18. Optical system 10 includes a drive mechanism 22, which is configured to provide relative movement between medium 12 and head 18 in a drive direction 24. Therefore, head 18 performs a scanning motion relative to surface 14. It will be appreciated by those ordinarily skilled in the art that the relative motion between head 18 and surface 14 is achieved either by moving head 18, medium 12 or by moving both head 18 and medium 12. Optical system 10 includes an auto-focus measurement system 26. As optical system 10 is generally configured to allow head 18 to perform a bi-directional scanning motion, auto-focus measurement system 26 includes two auto-focus measurement detectors 28 and associated optical components which are described in more detail with respect to FIG. 2. One auto-focus measurement detector 28 operates when head 18 moves in one direction relative to surface 14, and the other auto-focus measurement detector 28 operates when head 18 moves in the opposite direction relative to surface 14. Each auto-focus measurement detectors 28 is configured to perform a focus range measurement by directing one or more measurement rays 30 through the optical center of objective lens 20 of optical arrangement 16. The optical center of objective lens 20 is defined as a point in objective lens 20 where a ray passing through that point is not deflected significantly enough to effect focusing calculations based upon measurement rays 30. Therefore, while optical arrangement 16 is reading from, or writing to, a first region below head 18, one auto-focus measurement detector 28 performs a focus range measurement of a second region which is in front of the first region in the scan direction. Additionally, as measurement rays 30 pass through objective lens 20 of optical arrangement 16 the accuracy of the focus range measurement is improved. It should be noted that it is preferable to reduce the angle, A, which is between measurement rays 30 and a center line 34 of the light rays emitted by optical arrangement 16 from head 18, so that measurement rays 30 are less likely to be distorted by features on surface 14 of medium 12, such as steps. The measurement of distance for focusing purposes is known in the art. Optical system 10 also includes an auto-focus mechanical system 32. Auto-focus mechanical system 32 is configured to adjust the focus of optical arrangement 16 based upon one or more focus range measurements taken by auto-focus measurement system 26. The auto-focus operation of optical system 10 is described in more detail with respect to FIGS. 2 to 4.

Figure 2:
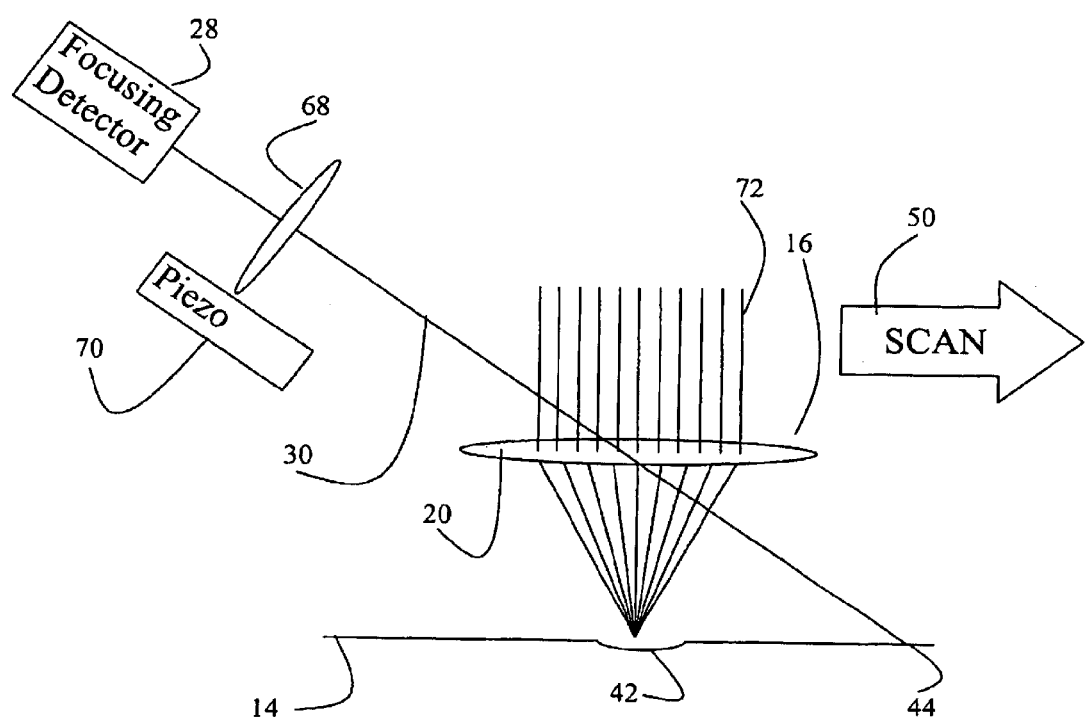
FIG. 2 is an enlarged schematic side view of an auto-focus measurement system of the sub-micron optical system of FIG. 1.
Figure 3:
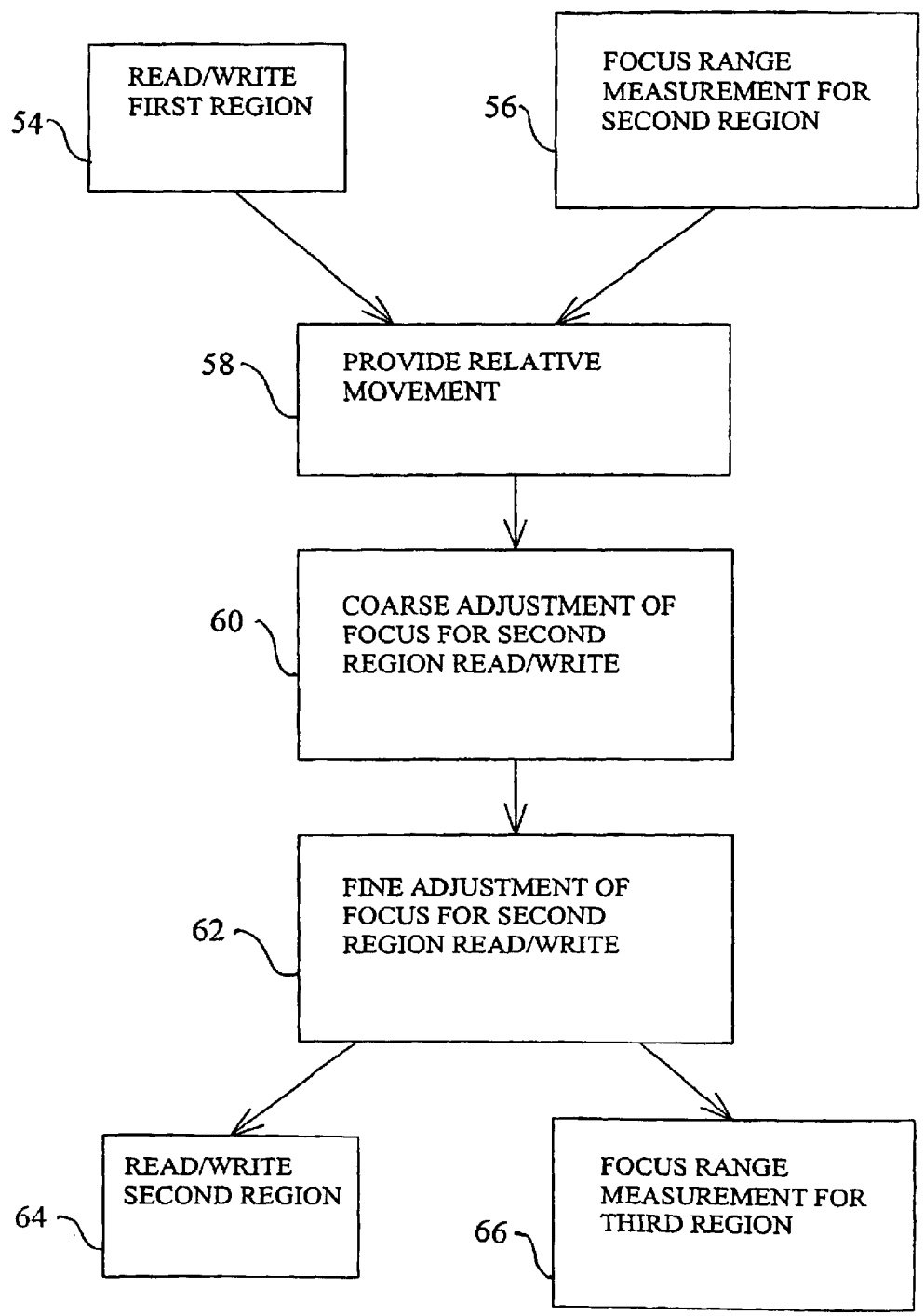
FIG. 3 is a chart showing the operation of the sub-micron optical system of FIG. 1.
Figure 4:
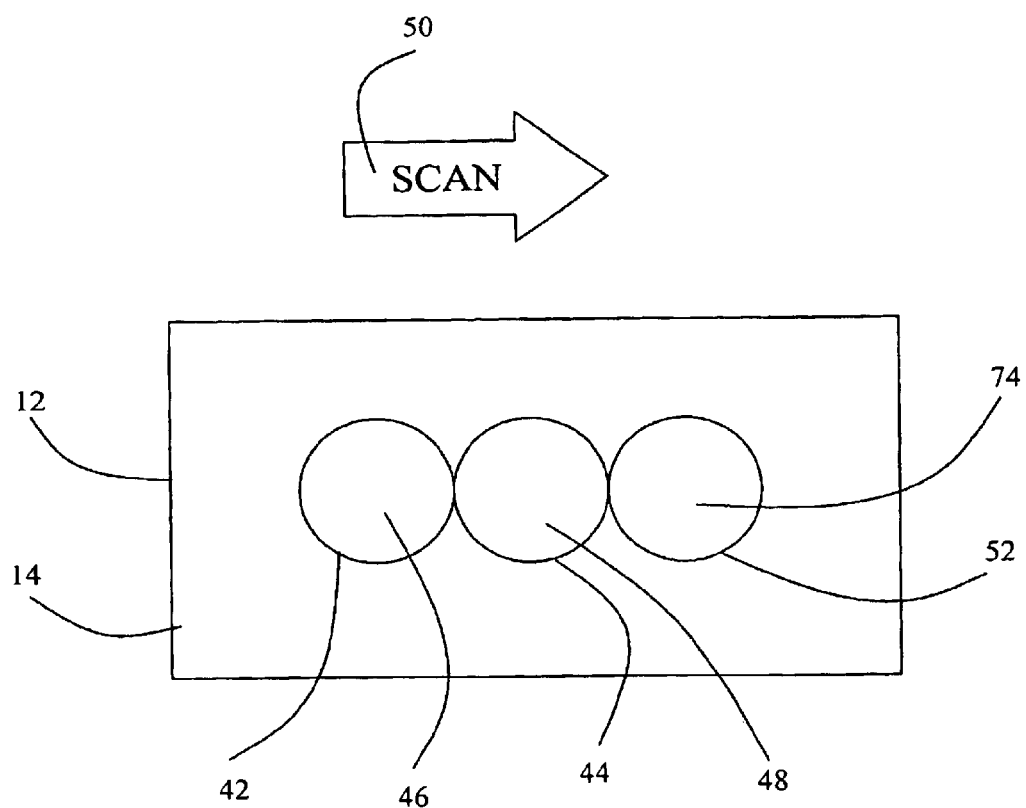
FIG. 4 is a schematic plan view of a medium being scanned by the sub-micron optical system of FIG. 1.

Reference is now made to FIGS. 2 to 4. FIG. 2 is an enlarged schematic side view of one auto-focus measurement detector 28. Auto-focus measurement detector 28 typically has an associated lens 68 and piezoelectric focus adjuster 70 which adjusts the focus of lens 68. FIG. 3 is a chart showing the operation of optical system 10 (FIG. 1). FIG. 4 is a schematic plan view of medium 12 being scanned by optical system 10. The method of operation of optical system 10 is generally as follows. Optical arrangement 16 illuminates at least part of a viewing region 42 of surface 14, with a plurality of light rays 72, in order to read from, or write to, surface 14 (block 54). Viewing region 42 is described as a "viewing" region in that optical arrangement 16 is only able to read from, or write to, those portions of surface 14 which can be viewed by optical arrangement 16. For example, some surface features may be hidden from the view of optical arrangement 16 even though these features form part of surface 14. Additionally, one auto-focus measurement detector 28 performs a focus range measurement of a viewing region 44 of surface 14 by sending one or more measurement rays 30 through the optical center of objective lens 20 of optical arrangement 16 (block 56). It should be noted that optical arrangement 16 reads from, or writes to, viewing region 42 at substantially the same time that auto-focus measurement detector 28 performs the focus range measurement of viewing region 44. "Substantially the same time" is defined as both steps being performed simultaneously, overlapping or time multiplexing. It should be noted that generally, the time auto-focus measurement detector 28 performs the focus range measurement of viewing region 44, optical arrangement 16 is positioned with respect to surface 14 to read from, or write to, viewing region 42, even if optical arrangement 16 is not actually reading or writing at that time. Additionally, the centroid 46 of viewing region 42 is offset from the centroid 48 of viewing region 44 in a scan direction 50, which is parallel to a direction of relative motion of medium 12 and head 18 (FIG. 1). Generally, to increase efficiency of the read/write process, optical system 10 is configured such that viewing region 42 and viewing region 44 are non-overlapping.

Drive mechanism 22 (FIG. 1) provides relative movement between medium 12 and head 18 in scan direction 50 in order for optical arrangement 16 to illuminate at least part of viewing region 44 for reading therefrom or writing thereto (block 58). At the same time as the above movement step is performed, auto-focus mechanical system 32 (FIG. 1) performs a coarse adjustment of the focus of optical arrangement 16 based upon the focus range measurement performed by auto-focus measurement detector 28 of viewing region 44 (block 60). Therefore, optical arrangement 16 is coarsely adjusted before optical arrangement 16 is positioned with respect to surface 14 to read from, or write to, viewing region 44.

Preferably, when optical arrangement 16 is positioned to read from, or write to, viewing region 44, a fine focusing range measurement of viewing region 44 is performed via optical arrangement 16 using techniques known in the art. The fine focus range measurement is then used to perform a fine focusing adjustment of optical arrangement 16 (block 62). As the majority of the focusing adjustment needed to accurately focus optical arrangement 16 with respect to viewing region 44 is performed, by the coarse adjustment, in advance of optical arrangement 16 being positioned to read from, or write to, viewing region 44, time delays associated with prior art auto-focus systems are greatly reduced.

Once optical arrangement 16 is accurately focused onto viewing region 44, optical arrangement 16 reads from, or writes to, viewing region 44 (block 64). At substantially the same time that the above read/write step is performed, one auto-focus measurement detector 28 performs a focus range measurement of a viewing region 52 (block 66). The centroid 74 of viewing region 52 is offset from centroid 48 of viewing region 44 in scan direction 50. The above steps are repeated as necessary.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art which would occur to persons skilled in the art upon reading the foregoing description.

What is claimed is:

1. An auto-focus method for focusing an optical arrangement of a sub-micron optical system, the optical system including a head, at least part of the optical arrangement being included in the head, the optical arrangement being configured for reading from or writing to a surface of a medium, the head performing a scanning motion relative to the surface, the method comprising:

(a) illuminating at least part of a first viewing region of the surface by the optical arrangement;

(b) performing a focus range measurement of a second viewing region of the surface, said step of configuring and said step of performing being performed substantially at the same time, wherein a centroid of said first viewing region is offset from a centroid of said second viewing region at least in a direction which is parallel to a direction of relative motion of the medium and the head;

(c) providing relative movement between the medium and the head in order for the optical arrangement to illuminate at least part of said second viewing region; and (d) adjusting the focus of the optical arrangement based upon said focus range measurement.

2. The method of claim 1, wherein said step of performing is performed by sending a measurement ray through at least part of the optical arrangement.

3. The method of claim 1, wherein:

(a) the optical arrangement includes a lens which is included in the head; and (b) said step of performing is performed by sending a measurement ray through said lens.

4. The method of claim 3, wherein said measurement ray passes through an optical center of said lens.

5. The method of claim 1, wherein said first viewing region and said second viewing region are non-overlapping.

6. A sub-micron optical system for reading from or writing to a surface of a medium, comprising:

(a) an optical arrangement and a head, at least part of said optical arrangement being included in said head;

(b) a drive mechanism configured for providing relative movement between the medium and said head in a drive direction;

(c) an auto-focus measurement system; and (d) an auto-focus mechanical system configured to adjust the focus of said optical arrangement based upon at least one focus range measurement taken by said auto-focus measurement system, wherein:

(i) said optical arrangement and said auto-focus measurement system are configured, such that, said optical arrangement illuminates at least part of a first viewing region of the surface substantially at the same time that said auto-focus measurement system performs a focus range measurement of a second viewing region of the surface; and (ii) a centroid of said first viewing region is offset from a centroid of said second viewing region at least in said drive direction.

7. The system of claim 6, wherein said auto-focus measurement system is configured to direct a measurement ray through at least part of said optical arrangement.

8. The system of claim 6, wherein:

(a) said optical arrangement includes a lens which is included in said head; and (b) said auto-focus measurement system is configured to direct a measurement ray through said lens.

9. The system of claim 8, wherein said auto-focus measurement system is configured to direct said measurement ray through an optical center of said lens.

10. The system of claim 6, wherein said first viewing region and said second viewing region are non-overlapping.

11. An auto-focus method for focusing an optical arrangement of an optical system, the optical system including a head, the optical arrangement including a lens, the lens being included in the head, the optical arrangement being configured for reading from or writing to a surface of a medium, the head performing a scanning motion relative to the surface, the method comprising:

(a) illuminating at least part of a first viewing region of the surface by the optical arrangement;

(b) performing a focus range measurement of a second viewing region of the surface, said performing including sending a measurement ray through the lens, said step of configuring and said step of performing being performed substantially at the same time, wherein a centroid of said first viewing region is offset from a centroid of said second viewing region at least in a direction which is parallel to a direction of relative motion of the medium and the head;

(c) providing relative movement between the medium and the head in order for the optical arrangement to illuminate at least part of said second viewing region; and (d) adjusting the focus of the optical arrangement based upon said focus range measurement.

12. The method of claim 11, wherein said measurement ray passes through an optical center of the lens.

13. The method of claim 11, wherein said first viewing region and said second viewing region are non-overlapping.

14. An optical system for reading from or writing to a surface of a medium, comprising:

(a) an optical arrangement and a head, said optical arrangement having a lens which is included in said head;

(b) a drive mechanism configured for providing relative movement between the medium and said head in a drive direction;

(c) an auto-focus measurement system configured to direct a measurement ray through said lens; and (d) an auto-focus mechanical system configured to adjust the focus of said optical arrangement based upon at least one focus range measurement taken by said auto-focus measurement system, wherein:

(i) said optical arrangement and said auto-focus measurement system are configured, such that, said optical arrangement illuminates at least part of a first viewing region of the surface substantially at the same time that said auto-focus measurement system performs a focus range measurement of a second viewing region of the surface; and (ii) a centroid of said first viewing region is offset from a centroid of said second viewing region at least in said drive direction.

15. The system of claim 14, wherein said auto-focus measurement system is configured to direct said measurement ray through an optical center of said lens.

16. The system of claim 14, wherein said first viewing region and said second viewing region are non-overlapping.

* * * * *